Dec. 18, 1945.  W. C. P. ZABEL ET AL  2,391,215
CULINARY UTENSIL
Filed June 26, 1944
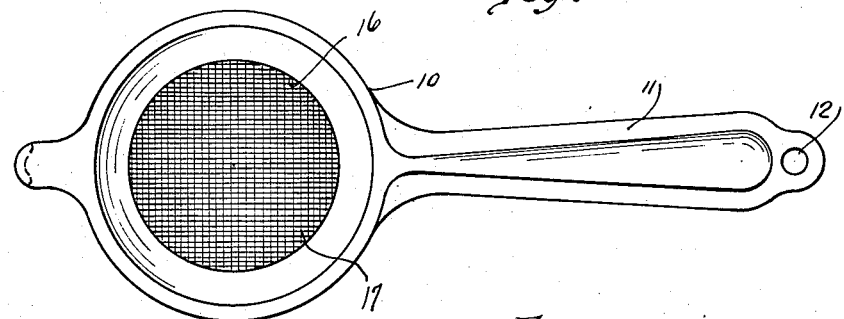
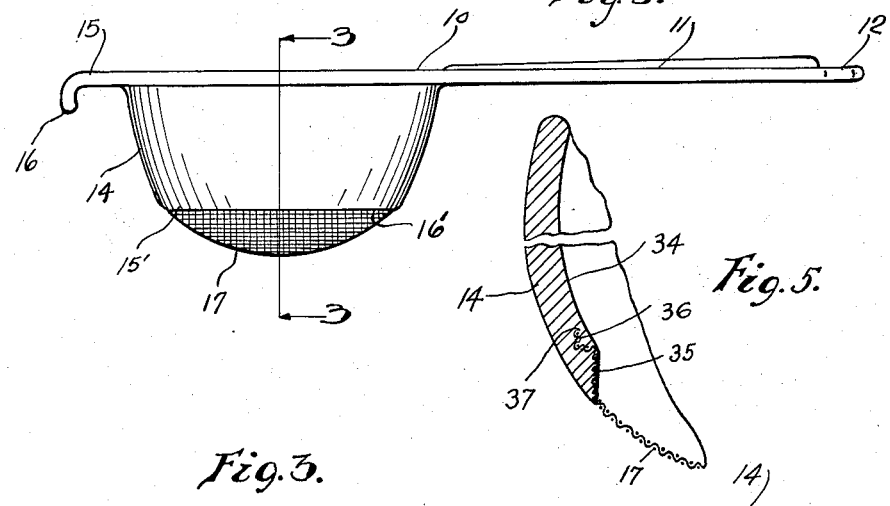
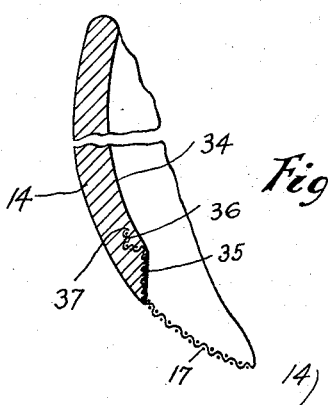
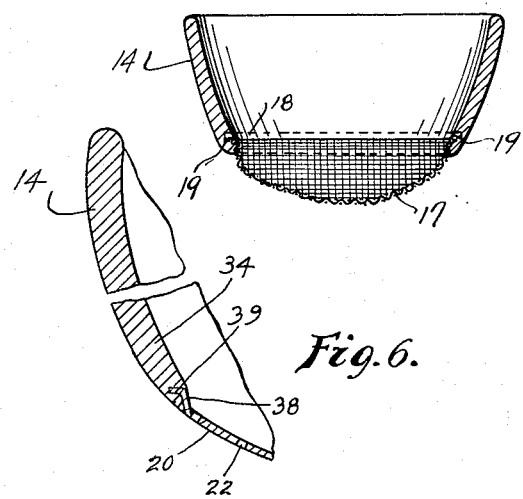
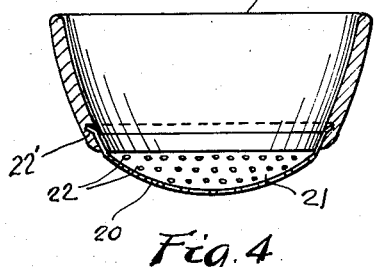
INVENTOR
William C. P. Zabel &
Richard C. Helfenbein
BY
Their Attorney Patented Dec. 18, 1945

2,391,215

UNITED STATES PATENT OFFICE 2,391,215

CULINARY UTENSIL

William C. P. Zabel, and Richard C. Helfenbein, Chicago, Ill.

Application June 26, 1944, Serial No. 542,155

1 Claim. (Cl. 210—161)

This invention relates to culinary utensils. More generally and specifically the invention relates to a strainer, and has for its principal object the provision of an improved construction of the character hereinafter described, which will be highly efficient in use and economical in manufacture.

An object of this invention is the provision of a strainer in which the major portion thereof is formed of thermoplastic material with the strainer portion molded or anchored therein during the molding operation of the major portion of the strainer, thereby resulting in a unitary utensil, the strainer portion of which is permanently anchored and durable in its proper relation to the plastic portion of the strainer, preventing the two parts from becoming separated or otherwise ruptured during use.

Yet a further and equally important object of the invention is the provision of a strainer, the bowl of which substantially has its major portion formed of plastic material with only so much thereof as required formed of mesh or other perforated material. It is well known in the use of strainers of the type hereinafter described that during the straining operation, the operator or user, in order to agitate the contents passing through the strainer, will move the strainer from side to side. In many instances, during this movement the bowl comes in contact with other objects and, if formed of a material easily dented or ruptured, the bowl shortly becomes unsightly, badly dented or otherwise ruptured. It is, therefore, an object of this invention to make that part of the bowl which is likely to come into contact with other objects during the straining operation, of a plastic material as distinguished from the usual mesh or perforated material, thus greatly strengthening the strainer and producing one in which the bowl, when subjected to contact with other articles would not be easily dented or ruptured.

Other objects will appear hereinafter.

The invention consists in the novel combination and arrangement of parts to be hereinafter described and claimed.

The invention will be best understood by reference to the accompanying drawing showing the preferred form of construction, and in which:

Fig. 1 is a top plan view of the strainer embodying the invention;

Fig. 2 is a side elevational view of the same;

Fig. 3 is a sectional detail view taken substantially on lines 3—3 of Fig. 2;

Fig. 4 is a view similar to Fig. 3 illustrating a concave, perforated metal bottom rather than one of wire mesh as shown in Fig. 3;

Fig. 5 is an enlarged fragmentary sectional detail view of the strainer shown in Fig. 3, illustrating the method of anchoring the bottom of the strainer to the bowl thereof; and Fig. 6 is an enlarged fragmentary sectional detail view of the strainer illustrated in Fig. 4 showing the preferred method of anchoring the bottom to the bowl thereof.

The drawing illustrates the preferred form of construction of our invention by which we accomplish the several objects thereof. In this connection the strainer is indicated at 10 and comprises a handle portion 11 having an opening 12 formed in one end therein to facilitate suspending the strainer from a stationary object, such for example a hook or the like.

The strainer 10 comprises a bowl 14 and extending from this bowl 14 opposite the handle 11 is a lip 15 having a downwardly turned portion 16 whereby the strainer may be supported on the edge of a bowl or pot or other culinary utensil with which it is being used. The bowl 14, as shown, like the handle 11 and lip 15 of the strainer, is formed of a plastic material, said parts being molded as a unitary structure. In the present instance the bowl 14 is provided at its bottom 15' with an opening 16', and mounted in this opening 16' is, as shown in Fig. 3, a strainer 17. In Fig. 3 this strainer 17 is shown in the form of a wire mesh, with the peripheral edge 18 thereof anchored as at 19 in the bowl 14 during the molding operation of the bowl 14. The bottom 20 of the bowl 14, in the form shown in Fig. 4, is of metal, concave as at 21, and provided with a plurality of perforations 22. This strainer portion of the bowl 14 is provided preferably with a peripheral edge 22' which, during the molding operation of the bowl 14, is anchored in the manner shown in Fig. 6.

Fig. 5 is a fragmentary enlargement of the strainer shown in Fig. 3 to better illustrate the method of anchoring the bottom 17 to the bowl 14. As shown in Fig. 5, the inside wall 34 of the bowl 14 is flush with the portion 35 of the strainer bottom inwardly of the peripheral edge 36 of the bottom 17, while the peripheral edge 36 is offset with respect to the portion 35 to provide an offset flange 37. By thus forming the peripheral edge 36 of the bottom 17 during the molding operation, the plastic material is prevented from flowing beyond the portion 35 of the strainer bottom, and yet the offset portion 36 of the bottom 17 will be firmly anchored in the bowl 14.

In Fig. 6, which is an enlarged illustration of the method of attaching the bottom 21 of the strainer shown in Fig. 4 to the bowl 14, the portion 38 inwardly of the peripheral edge 39, like the portion 35 in Fig. 5, is substantially flush with the inside wall 34 of the bowl 14, thus serving as a stop or abutment for the flow of the plastic material during the molding operation. The peripheral edge 39, like the peripheral edge 36, is flared upwardly and outwardly with respect to this portion 38 to provide an anchor as shown in Fig. 6, for embedding in the bowl 14 during the molding operation.

Thus, it will be seen that we provide a strainer comprising two pieces anchored firmly together during the molding operation of the plastic portion of the strainer. The bowl 14, being of plastic, is not easily dented or otherwise ruptured upon coming into contact with other objects.

The foregoing description manifestly displays that the strainer is of such construction that the same can be manufactured at a very economical cost. By anchoring the bottom of the bowl 15 during the molding operation, the parts are firmly and securely connected together as a unitary structure. A strainer constructed in the manner herein set forth may be manufactured to sell at an appealing price.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claim.

Having thus described our invention, what we claim as new and desire to protect by Letters Patent is:

A strainer comprising a bowl formed of thermoplastic material and having an open bottom, a strainer member mounted in said bottom and having a portion inwardly of the peripheral edge portion thereof disposed substantially flush with the inside wall of the bowl, the peripheral edge portion of said strainer bottom being offset with respect to said portion and being embedded in the wall of said bowl, substantially as described.

WILLIAM C. P. ZABEL.
RICHARD C. HELFENBEIN.